(12) United States Patent
Takikawa et al.

(10) Patent No.: US 9,791,019 B2
(45) Date of Patent: Oct. 17, 2017

(54) DAMPER DEVICE AND STARTING DEVICE

(71) Applicant: AISIN AW CO., LTD., Anjo-shi, Aichi-ken (JP)

(72) Inventors: Yoshihiro Takikawa, Tsushima (JP); Yoichi Oi, Ama (JP); Takayuki Miyaoka, Anjo (JP); Yuichiro Hirai, Okazaki (JP); Makoto Yamaguchi, Sabae (JP); Takuya Yoshikawa, Fukui (JP); Masahiro Hata, Sakai (JP)

(73) Assignee: AISIN AW CO., LTD., Anjo-Shi, Aichi-Ken (JP)

( * ) Notice: Subject to any disclaimer, the term of this patent is extended or adjusted under 35 U.S.C. 154(b) by 0 days.

(21) Appl. No.: 15/024,127

(22) PCT Filed: Oct. 16, 2014

(86) PCT No.: PCT/JP2014/077519
§ 371 (c)(1),
(2) Date: Mar. 23, 2016

(87) PCT Pub. No.: WO2015/056733
PCT Pub. Date: Apr. 23, 2015

(65) Prior Publication Data
US 2016/0208885 A1    Jul. 21, 2016

(30) Foreign Application Priority Data
Oct. 16, 2013   (JP) .................................. 2013-215475

(51) Int. Cl.
*F16H 45/02* (2006.01)
*F16F 15/123* (2006.01)
(Continued)

(52) U.S. Cl.
CPC .......... *F16F 15/13469* (2013.01); *F16D 3/12* (2013.01); *F16F 15/12366* (2013.01);
(Continued)

(58) Field of Classification Search
CPC ...... F16H 2045/0226; F16H 2045/0231; F16F 15/13469; F16F 15/12346; F16F 15/12353; F16F 15/12366; F16F 15/12373
See application file for complete search history.

(56) References Cited

U.S. PATENT DOCUMENTS

| 8,746,424 B2 | 6/2014 | Kneidel |
| 2004/0185940 A1* | 9/2004 | Yamamoto ........ F16F 15/12366 464/68.4 |

(Continued)

FOREIGN PATENT DOCUMENTS

| DE | EP 2014952 A1 * | 1/2009 | ............. F16H 45/02 |
| JP | 2001-82577 A | 3/2001 | |

(Continued)

OTHER PUBLICATIONS

International Search Report of PCT/JP2014/077519 dated Jan. 6, 2015.

*Primary Examiner* — Robert A Siconolfi
*Assistant Examiner* — Ryan Dodd
(74) *Attorney, Agent, or Firm* — Sughrue Mion, PLLC

(57) ABSTRACT

An intermediate member of a damper device includes a plate portion that has spring abutment portions that abut against inner springs. Spring abutment portions of a coupling member of a dynamic damper extend from a fixed portion via a bent portion to be disposed in opening portions of the plate portion, and abut against end portions of third springs disposed in the opening portions such that the third springs are arranged side by side with the inner springs in the circumferential direction. The plate portion and the spring abutment portions at least partially overlap each other in the thickness direction. The axes of the inner springs and the third springs are included within the range of overlap (Continued)

between the plate portion and the spring abutment portions in the thickness direction.

20 Claims, 6 Drawing Sheets

(51) Int. Cl.
    *F16F 15/134*     (2006.01)
    *F16D 3/12*     (2006.01)
    *F16F 15/14*     (2006.01)

(52) U.S. Cl.
    CPC .......... *F16F 15/134* (2013.01); *F16F 15/145* (2013.01); *F16H 45/02* (2013.01); *F16H 2045/021* (2013.01); *F16H 2045/0226* (2013.01); *F16H 2045/0263* (2013.01); *F16H 2045/0284* (2013.01)

(56) References Cited

U.S. PATENT DOCUMENTS

| | | | |
|---|---|---|---|
| 2011/0195795 A1* | 8/2011 | Murata | F16F 15/12366 464/67.1 |
| 2012/0080280 A1 | 4/2012 | Takikawa et al. | |

FOREIGN PATENT DOCUMENTS

| | | | |
|---|---|---|---|
| JP | 2012-77784 A | 4/2012 | |
| JP | 2012-77811 A | 4/2012 | |
| JP | 2013-537963 A | 10/2013 | |
| WO | 2011/076168 A1 | 6/2011 | |

\* cited by examiner

DAMPER DEVICE AND STARTING DEVICE

CROSS REFERENCE TO RELATED APPLICATIONS

This application is a National Stage of International Application No. PCT/JP2014/077519 filed Oct. 16, 2014, claiming priority based on Japanese Patent Application No. 2013-215475, filed Oct. 16, 2013, the contents of which are incorporated herein by reference in their entirety.

TECHNICAL FIELD

The present disclosure relates to a damper device that includes an input element, an output element, a first elastic body that transfers torque between the input element and the output element, and a second elastic body disposed at a position on the inner side of the first elastic body to transfer torque between the input element and the output element, and to a starting device that includes the damper device.

BACKGROUND ART

There has hitherto been known a damper device that includes a dynamic damper that has a third elastic body coupled to any rotary element that constitutes the damper device and a mass body coupled to the third elastic body (see Patent Document 1, for example). In the damper device, the third elastic body which constitutes the dynamic damper is disposed on the outer side or the inner side, in the radial direction, of the first and second elastic bodies which transfer torque between the input element and the output element, or between the first elastic body and the second elastic body in the radial direction.

In addition, there has hitherto been known a torque converter that includes a damper assembly that includes an output flange, a first cover plate, a first drive plate fixedly attached to a turbine shell, a plurality of first springs engaged with the first cover plate, a plurality of second springs engaged with the first cover plate and the output flange, a plurality of third springs engaged with the first cover plate and the first drive plate, and one torque path formed by the first drive plate from the turbine shell to the damper assembly (see Patent Document 2, for example). In the torque converter, the plurality of second springs and the plurality of third springs which constitute a dynamic damper together with a turbine are disposed at the same distance, in the radial direction, from the rotational axis of the torque converter.

RELATED-ART DOCUMENTS

Patent Documents

[Patent Document 1] International Patent Application Publication No. 2011/076168
[Patent Document 2] Published Japanese Translation of PCT Application No. 2013-537963 (JP 2013-537963 A)

SUMMARY

If the third elastic body which constitutes the dynamic damper is disposed at a different position, in the radial direction, from the first and second elastic bodies which transfer torque between the input element and the output element as in the damper device described in Patent Document 1, however, the outside diameter of the damper device may be increased, which makes it difficult to make the entire device compact. In the damper device described in Patent Document 2, on the other hand, the second springs and the third springs which constitute the dynamic damper are disposed at the same distance, in the radial direction, from the rotational axis, which suppresses an increase in outside diameter of the damper device. In the damper device described in Patent Document 2, however, the output plate abuts against the second springs at a position displaced from the center portion of the second springs in the extension direction of the rotational axis, and the first drive plate abuts against the second springs at a position displaced from the center portion of the third springs in the extension direction of the rotational axis. Therefore, the second and third springs may not be adequately expanded and contracted along the axes, and vibration may not be damped well.

It is therefore a main object of the present disclosure to further improve vibration damping performance by more adequately expanding and contracting elastic bodies of a dynamic damper and a damper device that includes the dynamic damper while making the damper device compact.

The present disclosures provides
a damper device that includes an input element, a first elastic body to which power is transferred from the input element, a second elastic body disposed on an inner side with respect to the first elastic body, an intermediate element that transfers power from the first elastic body to the second elastic body, and an output element to which power is transferred from the second elastic body and which is fixed to an output member, the damper device including:
a dynamic damper that includes a mass body, a third elastic body capable of abutting against the intermediate element or the output element, and a coupling member that has a fixed portion fixed to the mass body and a plurality of elastic body abutment portions provided such that the elastic body abutment portions abut against at least first end of the third elastic body, in which:
the intermediate element includes a plate-like plate portion that has an elastic body accommodation portion that accommodates the second elastic body, and an opening portion disposed on a circumference that passes through the elastic body accommodation portion;
the elastic body abutment portions of the coupling member extend from the fixed portion via a bent portion to be disposed in the opening portion of the plate portion of the intermediate element, and abut against an end portion of the third elastic body which is disposed in the opening portion such that the third elastic body is arranged side by side with the second elastic body in a circumferential direction; and
the plate portion of the intermediate element and the elastic body abutment portions of the coupling member at least partially overlap each other in a thickness direction, and axes of the second elastic body and the third elastic body are included within a range of overlap between the plate portion and the elastic body abutment portions in a thickness direction.

The damper device includes the dynamic damper which has the third elastic body which is supported by the coupling member and which is capable of abutting against the intermediate element or the output element, and the mass body which is coupled to the third elastic body via the coupling member. The intermediate element of the damper device includes the plate-like plate portion which has the elastic body accommodation portion which accommodates the second elastic body, and the opening portion which is disposed on the circumference which passes through the elastic body accommodation portion. The elastic body abutment portions of the coupling member extend from the fixed portion via the bent portion to be disposed in the opening portion of the plate portion of the intermediate element, and abut against an end portion of the third elastic body which is disposed in the opening portion such that the third elastic body is arranged side by side with the second elastic body in the circumferential direction. The plate portion of the intermediate element and the elastic body abutment portions of the coupling member at least partially overlap each other in the thickness direction, and the axes of the second elastic body and the third elastic body are included within the range of overlap between the plate portion and the elastic body abutment portions in the thickness direction.

Consequently, with the third elastic body of the dynamic damper disposed side by side with the second elastic body in the circumferential direction, an increase in outside diameter of the damper device can be suppressed to make the entire device compact compared to a case where the third elastic body is disposed on the outer side or the inner side, in the radial direction, of the first elastic body and the second elastic body or between the first elastic body and the second elastic body in the radial direction. In addition, with the elastic body abutment portions extending from the fixed portion of the coupling member, which is fixed to the mass body, via the bent portion and with the spring abutment portions disposed in the opening portion which is formed in the plate portion of the intermediate element, the plate portion and the spring abutment portions of the coupling member can be made not to be arranged in the axial direction of the damper device. Consequently, it is possible to suppress an increase in axial length of the damper device to make the entire device compact. In the damper device, in addition, the axes of the second elastic body and the third elastic body are included within the range of overlap between the plate portion and the elastic body abutment portions in the thickness direction. Thus, the intermediate element and the second elastic body which is accommodated in the spring accommodation portion of the plate portion can be brought into abutment with each other near the center line which passes through the axis of the second elastic body, and the elastic body abutment portions of the coupling member and the third elastic body can be brought into abutment with each other near the center line which passes through the axis of the third elastic body. Consequently, the second elastic body and the third elastic body can be expanded and contracted more adequately to further improve the vibration damping performance of the damper device which includes the dynamic damper. As a result, it is possible to further improve vibration damping performance by more adequately expanding and contracting the elastic bodies of the dynamic damper and the damper device which includes the dynamic damper while making the damper device compact.

The plate portion of the intermediate element, the elastic body abutment portions of the coupling member, and the second elastic body and the third elastic body may be disposed such that center lines of the plate portion and the elastic body abutment portions in the thickness direction and the axes of the second elastic body and the third elastic body are included within an identical plane that is orthogonal to an axis of the damper device. Consequently, it is possible to suppress an increase in axial length of the damper device to make the entire device more compact. In the damper device, in addition, the intermediate element and the second elastic body which is accommodated in the spring accommodation portion of the plate portion can be brought into abutment with each other on the center line which passes through the axis of the second elastic body, and the third elastic body can be supported by the elastic body abutment portions of the coupling member on the center line which passes through the axis of the third elastic body. As a result, the second elastic body and the third elastic body can be expanded and contracted more adequately to further improve the vibration damping performance of the damper device which includes the dynamic damper. Additionally, it is possible to suppress an increase in outside diameter of the damper device well if the distance between the axis of the damper device and the axis of the second elastic body and the distance between the axis of the damper device and the axis of third elastic body are equal to each other. It should be noted, however, that the second elastic body may be disposed (slightly) radially outwardly of the third elastic body as long as the second elastic body is disposed side by side with the third elastic body in the circumferential direction. Consequently, the second elastic body can be formed to have lower rigidity to further improve the damping performance of the entire damper device.

The plate portion of the intermediate element may be formed in an annular shape and includes a plurality of the elastic body accommodation portions and a plurality of the opening portions, and the elastic body accommodation portions and the opening portions may be disposed in the plate portion so as to be arranged alternately side by side with each other.

The fixed portion of the coupling member may be formed in an annular shape, and the plurality of elastic body abutment portions of the coupling member may extend radially outward from the fixed portion.

The coupling member may have a guide portion that extends radially outward from the fixed portion such that the second elastic body is guided.

The coupling member may have a guide portion formed between the elastic body abutment portions, which are adjacent to each other, such that the third elastic body is guided.

The output element may include first and second output plates coupled to each other; and the plate portion of the intermediate element and the elastic body abutment portions of the coupling member may be disposed between the first output plate and the second output plate. Consequently, the output-side abutment portions of the first and second output plates can be brought into abutment with the second elastic body at positions at which the output-side abutment portions are symmetric with respect to the center line which passes through the axis of the second elastic body, and the output-side abutment portions of the first and second output plates can be brought into abutment with the third elastic body at positions at which the output-side abutment portions are symmetric with respect to the center line which passes through the axis of the third elastic body, which makes it possible to more adequately expand and contract the second and third elastic bodies to further improve the vibration damping performance of the damper device.

The first output plate may be fixed to the output member; and the second output plate may be disposed so as to surround the fixed portion of the coupling member from a radially outer side, and swingably support a plurality of pendulum mass bodies to constitute a centrifugal-pendulum vibration absorbing device together with the pendulum mass bodies. Consequently, vibration of the entire damper device can be damped (absorbed) well by the dynamic damper and the centrifugal-pendulum vibration absorbing device. With the second output plate disposed so as to surround the fixed portion of the coupling member is surrounded, the second output plate and the fixed portion can be made not to be arranged side by side with each other in the axial direction of the damper device, which suppresses an increase in axial length of the damper device to make the entire device compact.

Each of the first and second output plates may have a plurality of guide portions that guide the second or third elastic body.

The present disclosure also provides a starting device that includes the damper device according to any of the above descriptions, a pump impeller coupled to an input member, a turbine runner that constitutes a fluid transmission apparatus together with the pump impeller, and a lock-up clutch, the starting device including: the second output plate is disposed on a side of the turbine runner with respect to the first output plate; the mass body of the dynamic damper includes the turbine runner; the fixed portion of the coupling member is fixed to an inner peripheral portion of the turbine runner; and the fixed portion is disposed in closer proximity to the first output plate than a portion of the second output plate that is positioned closest to the turbine runner.

In the starting device, the fixed portion of the coupling member of the dynamic damper is fixed to the inner peripheral portion of the turbine runner, and the turbine runner is used as the mass body of the dynamic damper. Consequently, there is no need to separately provide a mass body of the dynamic damper, which makes it possible to suppress an increase in size of the starting device. Further, the axial length of the starting device can be further shortened by disposing the fixed portion of the coupling member, which is fixed to the inner peripheral portion of the turbine runner, in closer proximity to the first output plate than a portion of the second output plate that is positioned closest to the turbine runner, the second output plate being disposed on the turbine runner side with respect to the first output plate.

In the starting device, the lock-up clutch may be a multi-plate clutch; the first elastic body and the second elastic body may be disposed away from each other in an axial direction; the first elastic body may be disposed on an outer side of the lock-up clutch so as to surround the lock-up clutch; the second elastic body may be disposed side by side with the lock-up clutch in the axial direction; and the plurality of pendulum mass bodies of the centrifugal-pendulum vibration absorbing device may be disposed on an outer side of the second elastic body so as to surround the second elastic body, and arranged side by side with the first elastic body in the axial direction. Consequently, a sufficient swing range of the pendulum mass bodies can be secured to further improve the vibration damping performance of the centrifugal-pendulum vibration absorbing device. Thus, with the starting device, it is possible to damp vibration from the input member to the output member well using the damper device which includes the dynamic damper and the centrifugal-pendulum vibration absorbing device while making the entire device compact.

DETAILED DESCRIPTION OF A PREFERRED EMBODIMENT

Now, an exemplary embodiment will be described with reference to the drawings.

Figure 1:
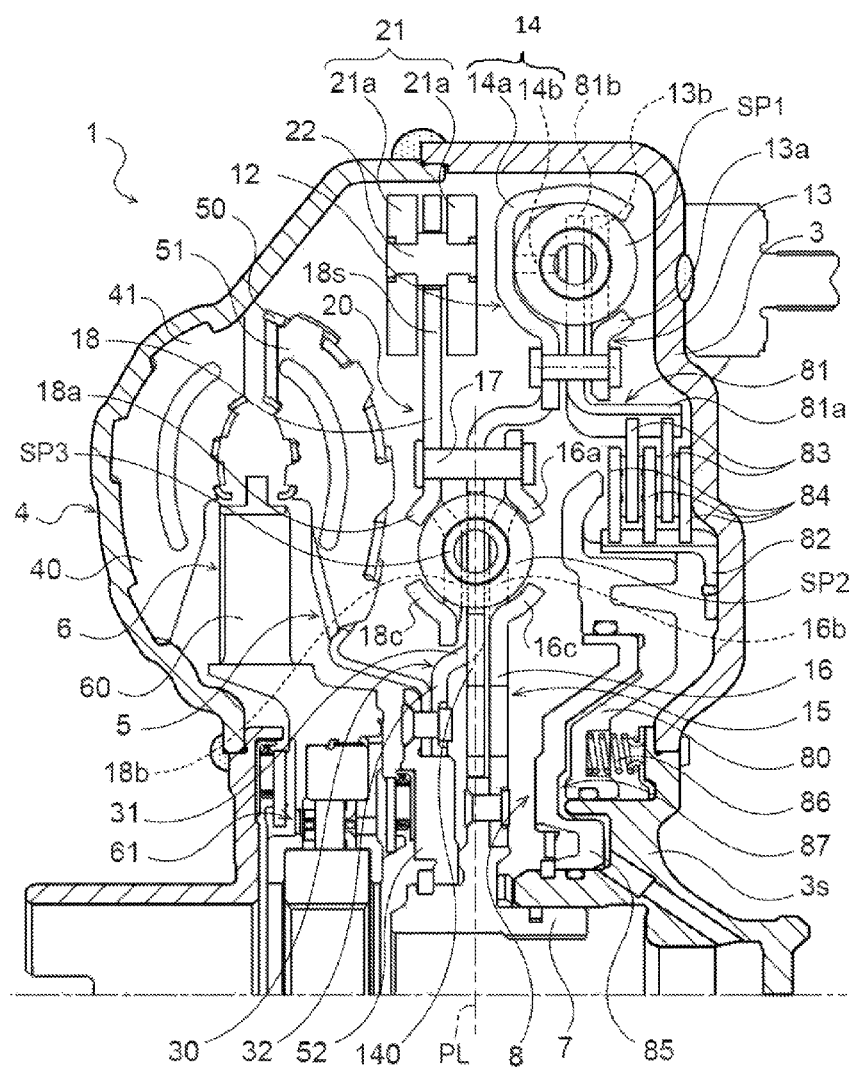
FIG. 1 is a partial sectional view illustrating a starting device that includes a damper device according to an embodiment described herein.

FIG. 1 is a partial sectional view illustrating a starting device 1 that includes a damper device 10 according to an exemplary embodiment. The starting device 1 illustrated in the drawing is mounted on a vehicle that includes an engine (internal combustion engine) that serves as a motor. In addition to the damper device 10, the starting device 1 includes: a front cover 3 that serves as an input member coupled to a crankshaft of the engine; a pump impeller (input-side fluid transmission element) 4 fixed to the front cover 3; a turbine runner (output-side fluid transmission element) 5 that is coaxially rotatable with the pump impeller 4; a damper hub 7 that serves as an output member coupled to the damper device 10 and fixed to an input shaft IS of a transmission that is an automatic transmission (AT) or a continuously variable transmission (CVT); a lock-up clutch 8 which is a multi-plate hydraulic clutch; a centrifugal-pendulum vibration absorbing device 20 and a dynamic damper 30 each coupled to the damper device 10; and so forth.

The pump impeller 4 has a pump shell 40 tightly fixed to the front cover 3, and a plurality of pump blades 41 disposed on the inner surface of the pump shell 40. The turbine runner 5 has a turbine shell 50, and a plurality of turbine blades 51 disposed on the inner surface of the turbine shell 50. The inner peripheral portion of the turbine shell 50 is fixed to a turbine hub 52 via a plurality of rivets. The turbine hub 52 is rotatably supported by the damper hub 7. Movement of the turbine hub 52 in the axial direction of the starting device 1 is restricted by the damper hub 7 and a snap ring mounted to the damper hub 7.

The pump impeller 4 and the turbine runner 5 face each other. A stator 6 is disposed between and coaxially with the pump impeller 4 and the turbine runner 5. The stator 6 rectifies a flow of working oil (working fluid) from the turbine runner 5 to the pump impeller 4. The stator 6 has a plurality of stator blades 60. The rotational direction of the stator 6 is set to only one direction by a one-way clutch 61. The pump impeller 4, the turbine runner 5, and the stator 6 form a torus (annular flow passage) that allows circulation of working oil, and function as a torque converter (fluid transmission apparatus) with a torque amplification function. It should be noted, however, that the stator 6 and the one-way clutch 61 may be omitted from the starting device 1, and that the pump impeller 4 and the turbine runner 5 may function as a fluid coupling.

The lock-up clutch 8 can establish and release lock-up in which the front cover 3 and the damper hub 7 are coupled to each other via the damper device 10. The lock-up clutch 8 includes: a lock-up piston 80 supported by a center piece 3s, which is fixed to the front cover 3, such that the lock-up piston 80 is moved in the axial direction; a clutch drum 81; an annular clutch hub 82 fixed to the inner surface of the front cover 3 such that the annular clutch hub 82 faces the lock-up piston 80; a plurality of first friction engagement plates (friction plates having a friction material on both surfaces) 83 fitted with spines formed on the inner periphery of the clutch drum 81; and a plurality of second friction engagement plates 84 (separator plates) fitted with splines formed on the outer periphery of the clutch hub 82.

Further, the lock-up clutch 8 includes: an annular flange member (oil chamber defining member) 85 attached to the center piece 3s of the front cover 3 such that the annular flange member 85 is positioned on the side opposite to the front cover 3 with respect to the lock-up piston 80, that is, positioned on the side of the damper hub 7 and the damper device 10 with respect to the lock-up piston 80; and a plurality of return springs 86 disposed between the front cover 3 and the lock-up piston 80. As illustrated in the drawing, the lock-up piston 80 and the flange member 85 define an engagement oil chamber 87. Working oil (engagement hydraulic pressure) is supplied to the engagement oil chamber 87 from a hydraulic control device (not illustrated). Increasing the engagement hydraulic pressure for the engagement oil chamber 87 moves the lock-up piston 80 in the axial direction such that the first and second friction engagement plates 83 and 84 are pressed toward the front cover 3, which can bring the lock-up clutch 8 into engagement (complete engagement or slip engagement). A hydraulic single-plate clutch that includes a lock-up piston to which a friction material is affixed may be adopted as the lock-up clutch 8.

Figure 2:
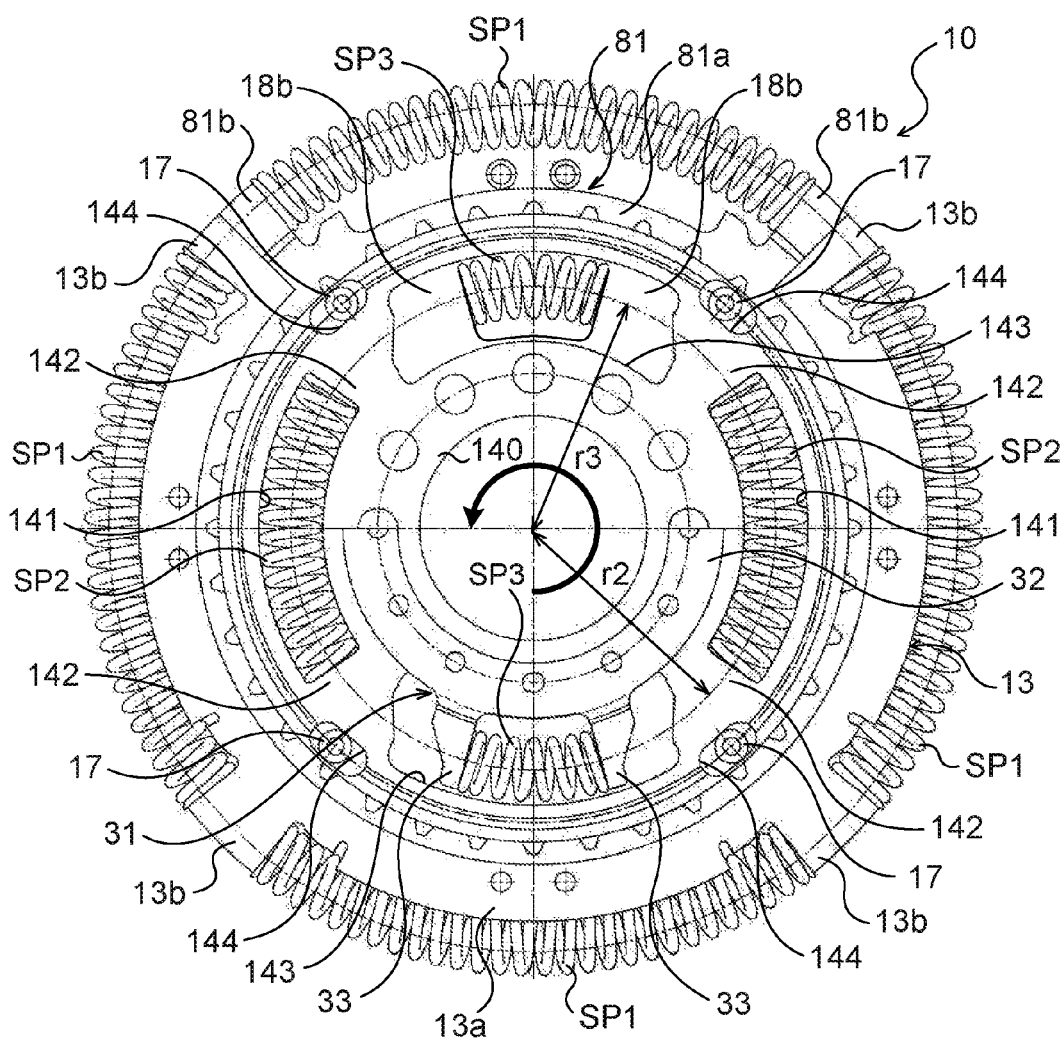
FIG. 2 is a plan view of the damper device illustrated in FIG. 1.

As illustrated in FIGS. 1 and 2, the damper device 10 utilizes the clutch drum 81 of the lock-up clutch 8 as an input element, and includes an intermediate member (intermediate element) 12 and a driven member (output element) 15 as rotary elements other than the clutch drum 81. Further, the damper device 10 includes, as power transfer elements, a plurality of (in the embodiment, four) outer springs (first elastic bodies) SP1 disposed at equal intervals on a concentric circle in proximity to the outer periphery of the damper device 10, and a plurality of (in the embodiment, two) inner springs (second elastic bodies) SP2 disposed at equal intervals on a concentric circle on the inner side with respect to the outer springs SP1.

In the embodiment, the outer springs SP1 are arc coil springs made of a metal material wound to have an axis that extends in an arc shape when no load is applied. Consequently, the outer springs SP1 are provided with lower rigidity (a smaller spring constant), and the damper device 10 is provided with lower rigidity (a longer stroke). In the embodiment, similarly, the inner springs SP2 are arc coil springs made of a metal material wound to have an axis (center line) that extends in an arc shape when no load is applied. It should be noted, however, that linear coil springs made of a metal material spirally wound to have an axis (center line) that extends straight when no load is applied may be adopted as the inner springs SP2.

The clutch drum 81 which also functions as the input element of the damper device 10 has: a drum portion 81a that has splines to be fitted with the first friction engagement plate 83; and a plurality of (in the embodiment, four) spring abutment portions (input-side abutment portions) 81b that extend radially outward from the outer peripheral portion of the drum portion 81a. With the damper device 10 attached, as illustrated in FIG. 2, the spring abutment portions 81b are provided between the outer springs SP1 which are adjacent to each other to abut against the outer springs SP1.

The intermediate member 12 includes: an annular first intermediate plate member 13 disposed on the side of the front cover 3 (lock-up piston 80); and an annular second intermediate plate member 14 disposed on the side of the pump impeller 4 and the turbine runner 5 and coupled (fixed) to the first intermediate plate member 13 via a plurality of rivets. As illustrated in FIG. 1, the first intermediate plate member 13 which constitutes the intermediate member 12 has: a spring guide portion 13a that guides the inner peripheral portion of the plurality of outer springs SP1; and a plurality of (in the embodiment, four) spring abutment portions 13b that extend radially outward. With the damper device 10 attached, as illustrated in FIG. 2, the spring abutment portions 13b are provided between the outer springs SP1 which are adjacent to each other to abut against the outer springs SP1.

As illustrated in FIG. 1, the second intermediate plate member 14 which constitutes the intermediate member 12 has a spring guide portion 14a that guides the outer peripheral portion and a side portion, on the turbine runner 5 side (on the left side in FIG. 1), of the plurality of outer springs SP1. The plurality of outer springs SP1 are guided by the spring guide portion 13a of the first intermediate plate member 13 discussed above and the spring guide portion 14a of the second intermediate plate member 14 to be disposed on the outer side of the lock-up clutch 8, that is, in the outer peripheral region in a fluid transmission chamber 9, so as to surround the lock-up clutch 8.

In addition, the second intermediate plate member 14 has: a plurality of (in the embodiment, four) spring abutment portions (intermediate-side abutment portions) 14b that extend in the axial direction from a side portion, on the turbine runner 5 side, of the spring guide portion 14a toward the front cover 3; and a flat annular plate portion 140 that is offset in the axial direction such that the flat annular plate portion 140 is positioned on the turbine runner 5 side (left side in FIG. 1) with respect to the spring guide portion 14a and that extends in the radial direction of the damper device 10. With the damper device 10 attached, as with the spring abutment portion 13b of the first intermediate plate member 13, the spring abutment portions 14b are provided between the outer springs SP1, which are adjacent to each other, to abut against the outer springs SP1.

As illustrated in FIG. 2, the plate portion 140 of the second intermediate plate member 14 is provided with: a plurality of (in the embodiment, two) spring accommodation portions (elastic body accommodation portions) 141, which are opening portions in which the inner springs SP2 are disposed, formed at equal intervals (in the embodiment, at intervals of 180°); and a plurality of (in the embodiment, four) spring abutment portions (intermediate-side abutment portions) 142 formed on both sides of the spring accommodation portions 141. With the damper device 10 attached, as illustrated in FIG. 2, two spring abutment portions 142 that face each other via the spring accommodation portion 141 abut against end portions of the inner spring SP2 provided between the spring abutment portions 142 (support both ends of the inner spring SP2). Further, the plate portion 140 is provided with a plurality of (in the embodiment, two) opening portions 143 disposed on a circumference that passes through the spring accommodation portions 141, such that each of the opening portions 143 is positioned between adjacent ones of the end portions of the different spring accommodation portions 141 (spring abutment portions 142). That is, the plurality of spring accommodation portions 141 and the plurality of opening portions 143 are arranged alternately along the circumferential direction of the plate portion 140. As illustrated in FIG. 2, in addition, the plate portion 140 is aligned and rotatably supported by the damper hub 7.

The driven member 15 includes: an annular first output plate member 16 disposed on the side of the front cover 3 (lock-up piston 80) and coupled (fixed) to the damper hub 7 via a plurality of rivets; and an annular second output plate member 18 disposed on the side of the pump impeller 4 and the turbine runner 5. The first output plate member 16 and the second output plate member 18 are coupled (fixed) to each other via a plurality of rivets 17 such that the plate portion 140 of the second intermediate plate member 14 is interposed. As illustrated in FIG. 2, the rivets 17 which couple the first output plate member 16 and the second output plate member 18 to each other are inserted into arc-shaped support holes 144 formed in the second intermediate plate member 14 of the intermediate member 12. Consequently, the intermediate member 12 (the first intermediate plate member 13 and the second intermediate plate member 14) is supported between the first output plate member 16 and the second output plate member 18 by the driven member 15 via the support holes 144 and the rivets 17 so as to be movable about the axis of the starting device 1 and the damper device 10.

As illustrated in FIG. 1, the first output plate member 16 which constitutes the driven member 15 has: a plurality of spring guide portions 16a formed on the inner peripheral side with respect to a coupling portion through which the rivets 17 are inserted; a plurality of (in the embodiment, four) spring abutment portions (output-side abutment portions) 16b capable of abutting against end portions of the corresponding inner springs SP2; and a plurality of spring guide portions 16c formed on the inner peripheral side of the first output plate member 16 with respect to the plurality of spring guide portions 16a. With the damper device 10 attached, two spring abutment portions 16b that face each other abut against end portions of the inner spring SP2 provided between the spring abutment portions 16b (support both ends of the inner spring SP2). In addition, the spring guide portions 16a and the spring guide portions 16c face each other in the radial direction of the first output plate member 16 to guide a side portion (on the right side in FIG. 1) of the inner springs SP2.

As illustrated in FIG. 1, the second output plate member 18 which constitutes the driven member 15 has: a plurality of spring guide portions 18a formed such that the spring guide portions 18a face the spring guide portions 16a of the first output plate member 16; a plurality of (in the embodiment, four) spring abutment portions (output-side abutment portions) 18b capable of abutting against end portions of the corresponding inner springs SP2; and a plurality of spring guide portions 18c formed such that the spring guide portions 18c face the spring guide portions 16c of the first output plate member 16. With the damper device 10 attached, two spring abutment portions 18b that face each other abut against end portions of the inner spring SP2 provided between the spring abutment portions 18b (support both ends of the inner spring SP2).

In addition, the spring guide portions 18a and the spring guide portions 18c face each other in the radial direction of the second output plate member 18 to guide a side portion (on the left side in FIG. 1) of the inner springs SP2. The plurality of inner springs SP2 are guided by the spring guide portions 16a and 16c of the first output plate member 16 discussed above and the spring guide portions 18a and 18c of the second output plate member 18 to be disposed on the inner side with respect to the plurality of outer springs SP1 away from the plurality of outer springs SP1 in the axial direction of the pump impeller 4 and the turbine runner 5 and in proximity to the input shaft IS, and to be arranged side by side with the lock-up clutch 8 (the lock-up piston 80, the clutch hub 82, and the first and second friction engagement plates 83 and 84) in the axial direction (to at least partially overlap the lock-up clutch 8 in the radial direction).

Further, the second output plate member 18 which constitutes the driven member 15 has a mass body support portion 18s that extends radially outward from the coupling portion, through which the rivets 17 are inserted, such that the mass body support portion 18s is arranged side by side with the outer springs SP1 in the axial direction. The mass body support portion 18s of the second output plate member 18 swingably supports a plurality of (e.g. three to four) pendulum mass bodies 21 such that the pendulum mass bodies 21 are adjacent to each other in the circumferential direction. Consequently, the centrifugal-pendulum vibration absorbing device 20 is constituted of the second output plate member 18 which serves as a support member and the plurality of pendulum mass bodies 21. In the centrifugal-pendulum vibration absorbing device 20, the plurality of pendulum mass bodies 21 are swung in the same direction as the second output plate member 18 (driven member 15), which serves as a support member that supports the pendulum mass bodies 21, along with rotation of the second output plate member 18 to apply, to the driven member 15 of the damper device 10, vibration in the opposite phase to vibration of the driven member 15.

As illustrated in FIG. 1, the plurality of pendulum mass bodies 21 of the centrifugal-pendulum vibration absorbing device 20 are disposed on the outer side of the inner springs SP2 so as to surround the inner springs SP2, and arranged side by side with the outer springs SP1 in the axial direction (to at least partially overlap the outer springs SP1 in the radial direction). In addition, the pendulum mass bodies 21 are each constituted of a support shaft (roller) 22 rollably inserted through a plurality of guide holes that are generally arcuate long holes, for example, formed at predetermined intervals in the mass body support portion 18s, and two metal plates (weights) 21a fixed to both ends of the support shaft. It should be noted, however, that the configuration of the centrifugal-pendulum vibration absorbing device 20 is not limited thereto. In addition, the centrifugal-pendulum vibration absorbing device 20 is coupled to the driven member 15 of the damper device 10 by sharing the driven member 15 shared as a support member that supports the pendulum mass bodies 21. However, the centrifugal-pendulum vibration absorbing device 20 may be configured to rotate together with the intermediate member 12 of the damper device 10 using a dedicated support member.

The dynamic damper 30 includes: a plurality of third springs (third elastic bodies) SP3 which are linear coil springs or arc coil springs (in the embodiment, two linear coil springs); and a coupling member 31 that is coupled to the third springs SP3 and that constitutes a mass body together with the turbine runner 5 and the turbine hub 52 discussed above. The "dynamic damper" is a mechanism that damps vibration of a vibrating body by applying, to the vibrating body, vibration in the opposite phase at a frequency (engine rotational speed) that coincides with the resonance frequency of the vibrating body, and is constituted by coupling a spring and a mass body to the vibrating body such that the spring and the mass body are not included in the torque transfer path. The dynamic damper can be caused to act at a desired frequency by adjusting the rigidity of the spring and the weight of the mass body.

The coupling member 31 of the dynamic damper 30 has: an annular fixed portion 32 fixed to the turbine shell 50 which constitutes the turbine runner 5; and a plurality of (in the embodiment, four) spring abutment portions (elastic body abutment portions) 33 that extend from the fixed portion 32 such that the spring abutment portions 33 abut against both ends of the third springs SP3. The fixed portion 32 of the coupling member 31 is fixed to the inner peripheral portion of the turbine shell 50 together with the turbine hub 52 via a plurality of rivets, and surrounded by the second output plate member 18 of the driven member 15. Further, the fixed portion 32 is disposed closer to the first output plate member 16 than the spring guide portions 18a and 18c which are portions of the second output plate member 18 that are positioned closest to the turbine runner 5. In addition, the plurality of spring abutment portions 33 are formed symmetrically with respect to the axis of the damper device 10 (starting device 1) such that two (a pair of) spring abutment portions 33 are proximate to each other. The two spring abutment portions 33 which are paired with each other face each other with a space therebetween, the space matching the natural length of the third springs SP3, for example.

Figure 3:
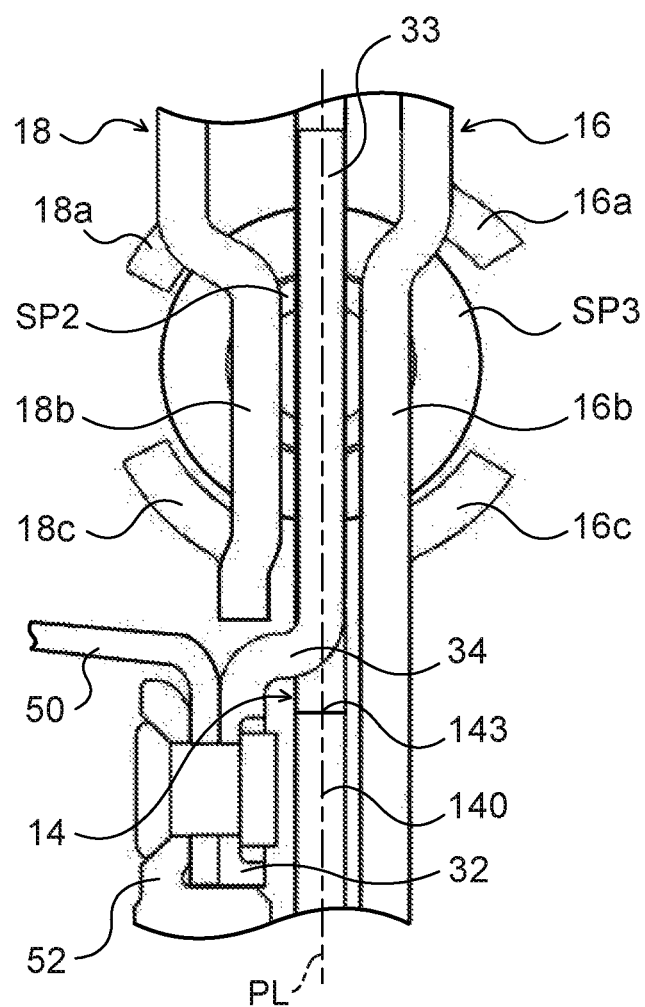
FIG. 3 is an enlarged view illustrating an essential portion of the damper device illustrated in FIG. 1.

Further, as illustrated in FIG. 3, the spring abutment portions 33 extend from the fixed portion 32 via a bent portion 34 so as to extend away from the fixed portion 32 in the axial direction and radially outward to be disposed in the opening portions 143 which are formed in the plate portion 140 of the second intermediate plate member 14, and are positioned between the first output plate member 16 and the second output plate member 18 in the axial direction together with the plate portion 140. That is, the plate portion 140 of the second intermediate plate member 14 and the spring abutment portions 33 of the coupling member 31 at least partially (in the embodiment, substantially completely) overlap each other in the thickness direction, and the axes of the inner springs SP2 and the third springs SP3 are included within the range of overlap between the plate portion 140 and the spring abutment portions 33 in the thickness direction.

Consequently, the plate portion 140 of the second intermediate plate member 14 which constitutes the intermediate member 12 and the spring abutment portions 33 of the coupling member 31 can be made not to be arranged in the axial direction of the damper device 10 while aligning the plate portion 140 using the damper hub 7. This makes it possible to suppress an increase in axial length of the damper device 10 to make the entire device compact. In addition, the spring abutment portions 142 of the intermediate member 12 and the inner springs SP2 which are accommodated in the spring accommodation portions 141 of the plate portion 140 can be brought into abutment with each other near the center line which passes through the axis of the inner springs SP2, and the spring abutment portions 33 of the coupling member 31 and the third springs SP3 can be brought into abutment with each other near the center line which passes through the axis of the third springs SP3. Consequently, the inner springs SP2 and the third springs SP3 can be expanded and contracted more adequately to further improve the vibration damping performance of the damper device 10 which includes the dynamic damper 30.

With the damper device 10 attached, as illustrated in FIG. 2, the third springs SP3 are each supported by a pair of spring abutment portions 33 such that each third spring SP3 is disposed between two inner springs SP2, which are adjacent to each other, and arranged side by side with the inner springs SP2 in the circumferential direction, and overlap the inner springs SP2 in both the axial direction and the circumferential direction of the starting device 1 and the damper device 10. That is, the spring abutment portions 33 of the coupling member 31 abut against end portions of the third springs SP3 which are disposed in the opening portions 143 of the plate portion 140 such that the third springs SP3 are arranged side by side with the inner springs SP2 in the circumferential direction. With the damper device 10 attached, in addition, both ends of each of the third springs SP3 abut against the spring abutment portions 16b of the first output plate member 16 and the spring abutment portions 18b of the second output plate member 18, the first and second output plate members 16 and 18 constituting the driven member 15. Consequently, the third springs SP3 are coupled to the driven member 15 which is an output element of the damper device 10.

Consequently, with the third springs SP3 which constitute the dynamic damper 30 disposed side by side with the inner springs SP2 in the circumferential direction, an increase in outside diameter of the damper device 10 can be suppressed to make the entire device compact compared to a case where the third springs SP3 are disposed on the outer side or the inner side, in the radial direction, of the outer springs SP1 and the inner springs SP2 or between the outer springs SP1 and the inner springs SP2 in the radial direction. In addition, in the embodiment, as illustrated in FIG. 3, the plate portion 140 of the second intermediate plate member 14 which constitutes the intermediate member 12, the spring abutment portions 33 of the coupling member 31, and the inner springs SP2 and the third springs SP3 are disposed such that the center lines, in the thickness direction, of the plate portion 140 and the spring abutment portions 33 and the axes of the inner springs SP2 and the third springs SP3 are included in an identical plane PL that is orthogonal to the axis of the damper device 10. Consequently, in addition to suppressing an increase in axial length of the damper device 10 to make the entire device more compact, the spring abutment portions 142 of the intermediate member 12 (second intermediate plate member 14) and the inner springs SP2 can be brought into abutment with each other on the center line which passes through the axis of the inner springs SP2, and the third springs SP3 can be supported by the spring abutment portions 33 of the coupling member 31 on the center line which passes through the axis of the third springs SP3.

In addition, in the embodiment, as illustrated in FIG. 2, the plurality of inner springs SP2 and the plurality of third springs SP3 are disposed on concentric circles, and a distance r2 between the axis of the starting device 1 and the damper device 10 and the axis of the inner springs SP2 and a distance r3 between the axis of the starting device 1 and the damper device 10 and the axis of the third springs SP3 are equal to each other. Consequently, it is possible to suppress an increase in outside diameter of the damper device 10 better. In the embodiment, further, the inner springs SP2 and the third springs SP3 are disposed such that the axes of the inner springs SP2 and the third springs SP3 are included in the identical plane PL (see FIG. 1) which is orthogonal to the axis of the starting device 1 and the damper device 10. Consequently, it is possible to also suppress an increase in axial length of the damper device 10.

Next, operation of the starting device 1 configured as described above will be described with reference to FIG. 4.

Figure 4:
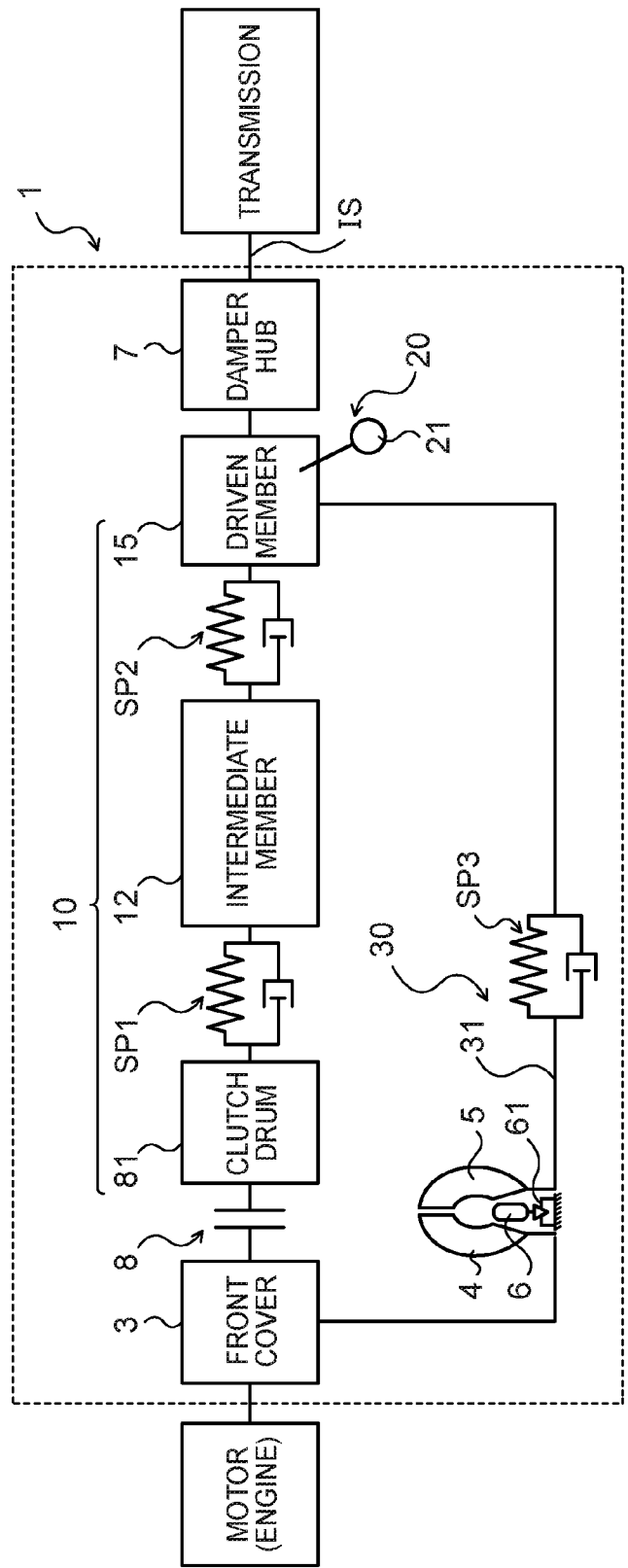
FIG. 4 is a schematic diagram of the starting device illustrated in FIG. 1.

When lock-up is released by the lock-up clutch 8 of the starting device 1, as seen from FIG. 4, torque (power) from the engine which serves as a motor is transferred to the input shaft IS of the transmission via a path that includes the front cover 3, the pump impeller 4, the turbine runner 5, the coupling member 31, the third springs SP3, the driven member 15, and the damper hub 7. Here, in the embodiment, the third springs SP3 are disposed side by side with the inner springs SP2 in the circumferential direction so as to overlap the inner springs SP2 both in the axial direction and the radial direction of the damper device 10 etc. Thus, compared to a case where the outer springs SP1, the inner springs SP2, and the third springs SP3 are disposed side by side in the radial direction of the damper device 10, the spring characteristics required for the damping performance can be achieved by securing a sufficient size (outside diameter) of the inner springs SP2 and the third springs SP3 to keep good durability of the inner springs SP2 and the third springs SP3 while providing the outer springs SP1, which are disposed in proximity to the outer periphery of the damper device 10, with lower rigidity (a smaller spring constant) to further improve the damping performance of the damper device 10. As a result, in the starting device 1, torque can be transferred from the front cover 3 to the input shaft IS of the transmission well even if the third springs SP3 are included in the power transfer path from the front cover 3 to the input shaft IS of the transmission when lock-up is released.

On the other hand, when lock-up is established by the lock-up clutch 8 of the starting device 1, as seen from FIG. 2, torque (power) from the engine which serves as a motor is transferred to the input shaft IS of the transmission via a path that includes the front cover 3, the lock-up clutch 8, the clutch drum (drive member) 81, the outer springs SP1, the intermediate member 12, the inner springs SP2, the driven member 15, and the damper hub 7. In this event, fluctuations in torque input to the front cover 3 are mainly damped (absorbed) by the outer springs SP1 and the inner springs SP2 of the damper device 10. Here, in the starting device 1, as discussed above, the outer springs SP1, which are disposed in proximity to the outer periphery of the damper device 10, can be provided with lower rigidity (a smaller spring constant). Thus, fluctuations in torque input to the front cover 3 can be damped (absorbed) well by the damper device 10 when lock-up is established by the lock-up clutch 8.

In the starting device 1, in addition, when the damper device 10, which is coupled to the front cover 3 by the lock-up clutch 8 along with lock-up, is rotated together with the front cover 3, the driven member 15 of the damper device 10 is also rotated about the axis of the starting device 1, and the pendulum mass bodies 21 which constitute the centrifugal-pendulum vibration absorbing device 20 are swung in the same direction as the driven member 15 along with rotation of the driven member 15. Consequently, vibration in the opposite phase to vibration (resonance) of the driven member 15 is applied from the centrifugal-pendulum vibration absorbing device 20 to the driven member 15, which also enables the centrifugal-pendulum vibration absorbing device 20 to damp (absorb) vibration between the front cover 3 and the damper hub 7.

Further, when lock-up is established, the pump impeller 4 and the turbine runner 5 (fluid transmission apparatus) are not involved in transfer of torque between the front cover 3 and the input shaft IS of the transmission. When the driven member 15 is rotated by torque from the engine along with rotation of the engine, any (any two sets) of the spring abutment portions 16b and 18b of the driven member 15 press first ends of the corresponding third springs SP3, and second ends of the third springs SP3 press one of the corresponding pair of spring abutment portions 33 of the coupling member 31. As a result, when the turbine runner 5 is not involved in transfer of power (torque), the dynamic damper 30 which includes the plurality of third springs SP3, the turbine runner 5 which serves as a mass body, and so forth is coupled to the driven member 15 of the damper device 10. Consequently, in the starting device 1, vibration from the engine can also be damped (absorbed) by the dynamic damper 30. It should be noted, however, that in the damper device 10 discussed above, the dynamic damper 30 may be coupled to the intermediate member 12 by bringing both ends of the third springs SP3 which constitute the dynamic damper 30 into abutment with both end portions, in the circumferential direction, of the opening portions 143 of the plate portion 140 (second intermediate plate member 14), rather than abutment with the spring abutment portions 16b of the first output plate member 16 and the spring abutment portions 18b of the second output plate member 18, the first output plate member 16 and the second output plate member 18 constituting the driven member 15.

As has been described above, the damper device 10 of the starting device 1 includes the dynamic damper 30 which has the third springs SP3 which are supported by the coupling member 31 such that the third springs SP3 abut against the spring abutment portions 16b and 18b of the driven member 15, the turbine runner 5 which serves as a mass body coupled to the third springs SP3 via the coupling member 31, and so forth. In addition, the intermediate member 12 of the damper device 10 includes the plate portion 140 which has the spring accommodation portions 141 which accommodate the inner springs SP2 and the spring abutment portions 142 which abut against the inner springs SP2, and which is aligned by the damper hub 7. Further, the spring abutment portions 33 of the coupling member 31 extend from the fixed portion 32 via the bent portion 34 to be disposed in the opening portions 143 which are formed in the plate portion 140 of the intermediate member 12, and support the third springs SP3 such that the third springs SP3 are arranged side by side with the inner springs SP2 in the circumferential direction. The plate portion 140 of the intermediate member 12, the spring abutment portions 33 of the coupling member 31, and the inner springs SP2 and the third springs SP3 are disposed such that the center lines, in the thickness direction, of the plate portion 140 and the spring abutment portions 33 and the axes of the inner springs SP2 and the third springs SP3 are included in the identical plane PL which is orthogonal to the axis of the damper device 10.

Consequently, with the third springs SP3 of the dynamic damper 30 disposed side by side with the inner springs SP2 in the circumferential direction, an increase in outside diameter of the damper device 10 can be suppressed to make the entire device compact compared to a case where the third springs SP3 are disposed on the outer side or the inner side, in the radial direction, of the outer springs SP1 and the inner springs SP2 or between the outer springs SP1 and the inner springs SP2 in the radial direction. In addition, with the spring abutment portions 33 extending from the fixed portion 32 of the coupling member 31, which is fixed to the turbine runner 5 which serves as a mass body, via the bent portion 34 and with the spring abutment portions 33 disposed in the opening portions 143 which are formed in the plate portion 140 of the intermediate member 12, the plate portion 140 of the intermediate member 12 and the spring abutment portions 33 of the coupling member 31 can be made not to be arranged in the axial direction of the damper device 10 while aligning the plate portion 140 using the damper hub 7. Consequently, it is possible to suppress an increase in axial length of the damper device 10 to make the entire device compact.

Further, it is possible to suppress an increase in axial length of the damper device 10 to make the entire device compact by arranging the center line, in the thickness direction, of the plate portion 140 of the intermediate member 12, the center line, in the thickness direction, of the spring abutment portions 33 of the coupling member 31, and the axes of the inner springs SP2 and the third springs SP3 to be included in the identical plane PL which is orthogonal to the axis of the damper device 10. Additionally, with the damper device 10, the spring abutment portions 142 of the intermediate member 12 and the inner springs SP2 can be brought into abutment with each other on the center line which passes through the axis of the inner springs SP2, and the third springs SP3 can be supported by the spring abutment portions 33 of the coupling member 31 on the center line which passes through the axis of the third springs SP3. Consequently, the inner springs SP2 and the third springs SP3 can be expanded and contracted more adequately to further improve the vibration damping performance of the damper device 10 which includes the dynamic damper 30.

Figure 5:
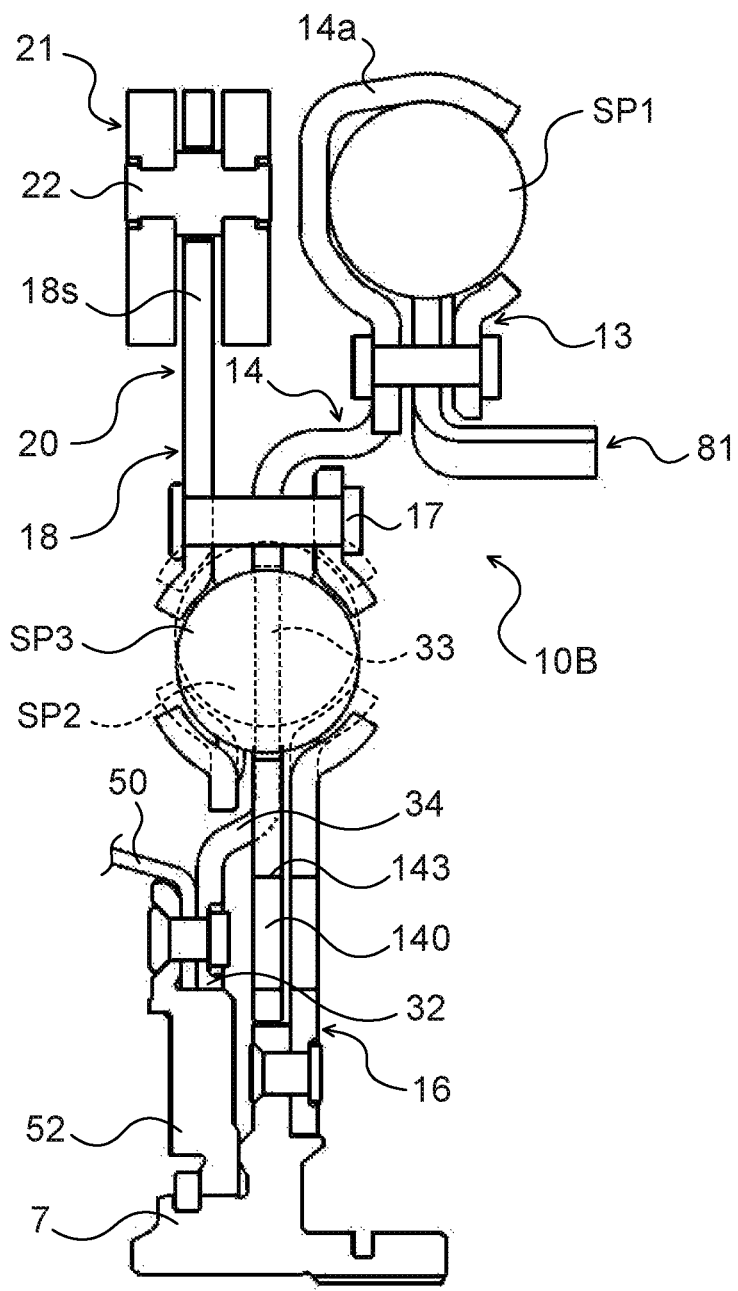
FIG. 5 is a schematic diagram illustrating a damper device according to a modification.

In the embodiment described above, in addition, it is possible to suppress an increase in outside diameter of the damper device 10 well if the distance r2 between the axis of the damper device 10 and the axis of the inner springs SP2 and the distance r3 between the axis of the damper device 10 and the axis of third springs SP3 are equal to each other. It should be noted, however, that the inner springs SP2 may be disposed (slightly) radially outwardly of the third springs SP3, as in a damper device 10B illustrated in FIG. 5, as long as the inner springs SP2 are disposed side by side with the third springs SP3 in the circumferential direction. Consequently, the inner springs SP2 can be formed to have lower rigidity to further improve the damping performance of the entire damper device 10. The axis of the outer springs SP1 and the axis of the third springs SP3 may not be included in a completely identical plane, and may be slightly displaced from each other in the axial direction because of a design tolerance or the like.

In the damper device 10, further, the driven member 15 includes the first and second output plates members 16 and 18 which have the spring abutment portions 16b and 18b, respectively, and which are coupled to each other, and the plate portion 140 of the intermediate member 12 and the spring abutment portions 33 of the coupling member 31 are disposed between the first output plate member 16 and the second output plate member 18 in the axial direction. Consequently, the spring abutment portions 16b and 18b of the first and second output plate members 16 and 18, respectively, can be brought into abutment with the inner springs SP2 at positions at which the spring abutment portions 16b and 18b are symmetric with respect to the center line which passes through the axis of the inner springs SP2, and the spring abutment portions 16b and 18b of the first and second output plate members 18, respectively, can be brought into abutment with the third springs SP3 at positions at which the spring abutment portions 16b and 18b are symmetric with respect to the center line which passes through the axis of the third springs SP3, which makes it possible to more adequately expand and contract the inner springs SP2 and the third springs SP3 to further improve the vibration damping performance of the damper device 10.

In the damper device 10, in addition, the first output plate member 16 is fixed to the damper hub 7, and the second output plate member 18 is disposed so as to surround the fixed portion 32 of the coupling member 31 from the radially outer side, and swingably supports the plurality of pendulum mass bodies 21 to constitute the centrifugal-pendulum vibration absorbing device 20 together with the pendulum mass bodies 21. Consequently, vibration of the entire damper device 10 can be damped (absorbed) well by the dynamic damper 30 and the centrifugal-pendulum vibration absorbing device 20. With the second output plate member 18 disposed so as to surround the fixed portion 32 of the coupling member 31 from the radially outer side, and with the second output plate member 18 and the fixed portion 32 at least partially (in the embodiment, substantially completely) overlapping each other in the thickness direction, the second output plate member 18 and the fixed portion 32 of the coupling member 31 can be made not to be arranged side by side with each other in the axial direction of the damper device 10, which suppresses an increase in axial length of the damper device 10 to make the entire device compact.

In the starting device 1 discussed above, further, the fixed portion 32 of the coupling member 31 of the dynamic damper 30 is fixed to the inner peripheral portion of the turbine shell 50, and the turbine runner 5 is used as a mass body of the dynamic damper 30. Consequently, there is no need to separately provide a mass body of the dynamic damper 30, which makes it possible to suppress an increase in size of the starting device 1. It should be noted, however, that the dynamic damper 30 may be configured to have a dedicated mass body that is different from the turbine runner 5.

In addition, the axial length of the starting device 1 can be further shortened by disposing the fixed portion 32 of the coupling member 31, which is fixed to the inner peripheral portion of the turbine runner 5 (turbine shell 50), in closer proximity to the first output plate member 16 than the spring guide portions 18a and 18c, which are portions of the second output plate member 18 that are positioned closest to the turbine runner 5, the second output plate member 18 being disposed on the turbine runner 5 side with respect to the first output plate member 16.

In the starting device 1, further, the outer springs SP1 and the inner springs SP2 are disposed away from each other in the axial direction of the pump impeller 4 and the turbine runner 5, the outer springs SP1 are disposed on the outer side of the lock-up clutch 8 so as to surround the lock-up clutch 8, and the inner springs SP2 are disposed side by side with the lock-up clutch 8 in the axial direction (to at least partially overlap the lock-up clutch 8 in the radial direction). The plurality of pendulum mass bodies 21 of the centrifugal-pendulum vibration absorbing device 20 are disposed on the outer side of the inner springs SP2 so as to surround the inner springs SP2, and arranged side by side with the outer springs SP1 in the axial direction (to at least partially overlap the outer springs SP1 in the radial direction). Consequently, a sufficient swing range of the pendulum mass bodies 21 can be secured to further improve the vibration damping performance of the centrifugal-pendulum vibration absorbing device 20. Thus, with the starting device 1, it is possible to damp vibration from the engine well using the damper device 10 which includes the dynamic damper 30 and the centrifugal-pendulum vibration absorbing device 20 while making the entire device compact.

Figure 6:
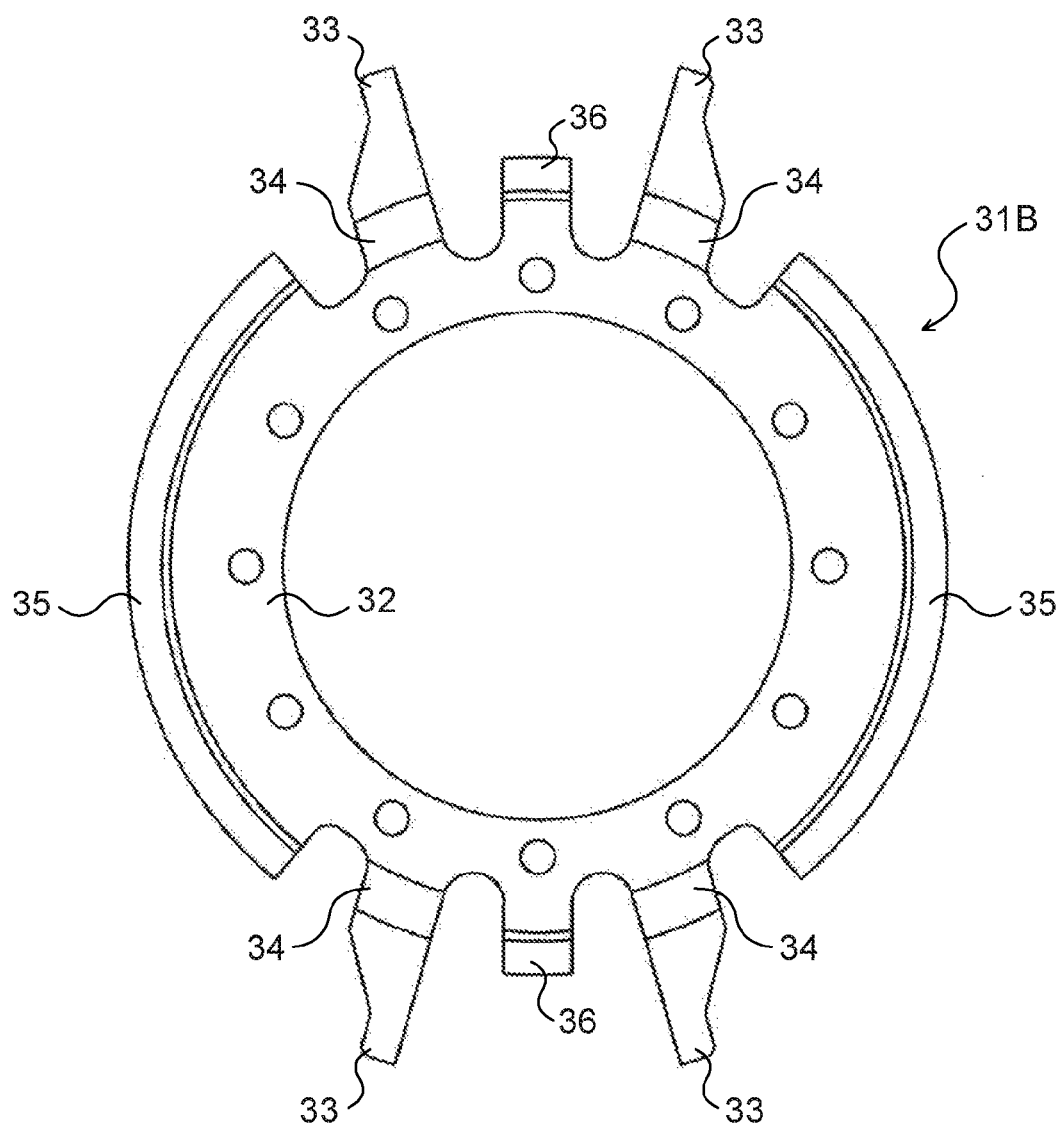
FIG. 6 is a plan view illustrating a coupling member that constitutes a dynamic damper according to a modification.

In the dynamic damper 30, a coupling member 31B illustrated in FIG. 6 may be adopted in place of the coupling member 31 discussed above. The coupling member 31B illustrated in the drawing has spring guide portions 35 that extend radially outward from the fixed portion 32 such that the spring guide portions 35 guide a side portion (on the left side in FIG. 1) of the inner springs of the damper device. In the case where such a dynamic damper 30 is applied to the damper device 10 discussed above, the spring guide portions 18c on the innermost peripheral side can be omitted from the second output plate member 18 of the damper device 10. Consequently, the second output plate member 18 can be formed easily while preventing distortion etc. of the inner peripheral portion of the second output plate member 18. In addition, as illustrated in FIG. 6, a spring guide portion 36 that guides a side portion of the third spring SP3 may be formed between spring abutment portions 33 that face each other.

With the damper device 10 attached, in addition, both end portions of each of the third springs SP3 are supported by a pair of (two) spring abutment portions 33 of the coupling member 31, and abut against the spring abutment portions 16b of the first output plate member 16 and the spring abutment portions 18b of the second output plate member 18, the first and second output plate members 16 and 18 constituting the driven member 15. However, the present disclosure is not limited thereto. That is, the number of third springs SP3 that constitute the dynamic damper 30 may be increased as appropriate, and the coupling member 31 may be provided with a spring abutment portion provided between two third springs SP3 that are adjacent to each other, the spring abutment portion abutting against end portions of the two third springs SP3, so that the two third springs SP3 which are adjacent to each other via the spring abutment portion can be supported by spring abutment portions of the driven member 15 or the like from both sides. Consequently, backlash, that is, a clearance between an end portion of the third spring SP3 and a spring abutment portion, due to a manufacturing tolerance that tends to be caused in the case where each third spring SP3 is supported from both sides by at least a pair of spring abutment portions, can be eliminated. Thus, the dynamic damper 30 can be actuated smoothly.

The present subject matter is not limited to the exemplary embodiment described above in any way, and it is a matter of course that it may be modified in various ways as would be apparent to those skilled in the art.

INDUSTRIAL APPLICABILITY

The present disclosure can, for example, be utilized in the field of manufacture of damper devices and starting devices that include a damper device.

The invention claimed is:

1. A damper device that includes an input element, a first elastic body to which power is transferred from the input element, a second elastic body disposed on an inner side with respect to the first elastic body, an intermediate element that transfers power from the first elastic body to the second elastic body, and an output element to which power is transferred from the second elastic body and which is fixed to an output member, the damper device comprising:
   a dynamic damper that includes a mass body, a third elastic body capable of abutting against the intermediate element or the output element, and a coupling member that has a fixed portion fixed to the mass body and a plurality of elastic body abutment portions provided such that the elastic body abutment portions abut against at least a first end of the third elastic body, wherein:
   the intermediate element includes a plate-shaped plate portion that has an elastic body accommodation portion that accommodates the second elastic body, and an opening portion disposed on a circumference that passes through the elastic body accommodation portion;
   the elastic body abutment portions of the coupling member extend from the fixed portion via a bent portion, to be disposed in the opening portion of the plate portion of the intermediate element, and abut against an end portion of the third elastic body which is disposed in the opening portion such that the third elastic body is arranged side by side with the second elastic body in a circumferential direction; and
   the plate portion of the intermediate element and the elastic body abutment portions of the coupling member at least partially overlap each other in a thickness direction, and axes of the second elastic body and the third elastic body are included within a range of overlap between the plate portion and the elastic body abutment portions in a thickness direction, wherein each axis of the axes lie along a center for a corresponding elastic body and extend in a direction of an expansion or contraction direction of an end of the corresponding elastic body.

2. The damper device according to claim 1, wherein the plate portion of the intermediate element, the elastic body abutment portions of the coupling member, and the second elastic body and the third elastic body are disposed such that center lines of the plate portion and the elastic body abutment portions in the thickness direction and the axes of the second elastic body and the third elastic body are included within an identical plane that is orthogonal to an axis of the damper device.

3. The damper device according to claim 2, wherein the plate portion of the intermediate element is formed in an annular shape and includes a plurality of the elastic body accommodation portions and a plurality of the opening portions, and the elastic body accommodation portions and the opening portions are disposed in the plate portion so as to be arranged alternately side by side with each other.

4. The damper device according to claim 3, wherein the fixed portion of the coupling member is formed in an annular shape, and the plurality of elastic body abutment portions of the coupling member extend radially outward from the fixed portion.

5. The damper device according to claim 4, wherein the coupling member has a guide portion that extends radially outward from the fixed portion such that the guide portion guides the second elastic body.

6. The damper device according to claim 5, wherein the coupling member has a second guide portion formed between the elastic body abutment portions, which are adjacent to each other, such that the second guide portion guides the third elastic body.

7. The damper device according to claim 6, wherein the output element includes first and second output plates coupled to each other; and
   the plate portion of the intermediate element and the elastic body abutment portions of the coupling member are disposed between the first output plate and the second output plate.

8. The damper device according to claim 7, wherein the first output plate is fixed to the output member; and
   the second output plate is disposed so as to surround the fixed portion of the coupling member from a radially outer side, and swingably supports a plurality of pendulum mass bodies to constitute a centrifugal-pendulum vibration absorbing device together with the pendulum mass bodies.

9. The damper device according to claim 8, wherein each of the first and second output plates has a plurality of guide portions that guide the second or third elastic body.

10. A starting device that includes the damper device according to claim 9, a pump impeller coupled to an input member, a turbine runner that constitutes a fluid transmission apparatus together with the pump impeller, and a lock-up clutch, wherein the second output plate is disposed on a side of the turbine runner with respect to the first output plate;

the mass body of the dynamic damper includes the turbine runner;

the fixed portion of the coupling member is fixed to an inner peripheral portion of the turbine runner; and the fixed portion is disposed closer to the first output plate than a portion of the second output plate that is positioned closest to the turbine runner.

11. The starting device according to claim 10, wherein the lock-up clutch is a multi-plate clutch;

the first elastic body and the second elastic body are disposed away from each other in an axial direction;

the first elastic body is disposed on an outer side of the lock-up clutch so as to surround the lock-up clutch;

the second elastic body is disposed side by side with the lock-up clutch in the axial direction; and the plurality of pendulum mass bodies of the centrifugal-pendulum vibration absorbing device are disposed on an outer side of the second elastic body so as to surround the second elastic body, and arranged side by side with the first elastic body in the axial direction.

12. The damper device according to claim 1, wherein the plate portion of the intermediate element is formed in an annular shape and includes a plurality of the elastic body accommodation portions and a plurality of the opening portions, and the elastic body accommodation portions and the opening portions are disposed in the plate portion so as to be arranged alternately side by side with each other.

13. The damper device according to claim 1, wherein the fixed portion of the coupling member is formed in an annular shape, and the plurality of elastic body abutment portions of the coupling member extend radially outward from the fixed portion.

14. The damper device according to claim 2, wherein the fixed portion of the coupling member is formed in an annular shape, and the plurality of elastic body abutment portions of the coupling member extend radially outward from the fixed portion.

15. The damper device according to claim 12, wherein the fixed portion of the coupling member is formed in an annular shape, and the plurality of elastic body abutment portions of the coupling member extend radially outward from the fixed portion.

16. The damper device according to claim 1, wherein the coupling member has a guide portion that extends radially outward from the fixed portion such that the guide portion guides the second elastic body.

17. The damper device according to claim 2, wherein the coupling member has a guide portion that extends radially outward from the fixed portion such that the guide portion guides the second elastic body.

18. The damper device according to claim 1, wherein the coupling member has a guide portion formed between the elastic body abutment portions, which are adjacent to each other, such that the guide portion guides the third elastic body.

19. The damper device according to claim 2, wherein the coupling member has a guide portion formed between the elastic body abutment portions, which are adjacent to each other, such that the guide portion guides the third elastic body.

20. The damper device according to claim 17, wherein the coupling member has a second guide portion formed between the elastic body abutment portions, which are adjacent to each other, such that the second guide portion guides the third elastic body.

* * * * *